US010474911B2

(12) United States Patent
Kim et al.

(10) Patent No.: US 10,474,911 B2
(45) Date of Patent: *Nov. 12, 2019

(54) SMART PARKING ASSIST APPARATUS AND METHOD (71) Applicant: Hyundai Motor Company, Seoul (KR)

(72) Inventors: Young Bin Kim, Seoul (KR); Jin Ho Park, Gyeonggi-do (KR); Joo Woong Yang, Seoul (KR)

(73) Assignee: Hyundai Motor Company, Seoul (KR)

( * ) Notice: Subject to any disclaimer, the term of this patent is extended or adjusted under 35 U.S.C. 154(b) by 65 days.

This patent is subject to a terminal disclaimer.

(21) Appl. No.: 15/391,261

(22) Filed: Dec. 27, 2016

(65) Prior Publication Data

US 2017/0106856 A1 Apr. 20, 2017

Related U.S. Application Data (63) Continuation of application No. 14/809,223, filed on Jul. 26, 2015, now Pat. No. 9,754,173.

(30) Foreign Application Priority Data

Oct. 17, 2014 (KR) .................. 10-2014-0140723

(51) Int. Cl.
*G06K 9/00* (2006.01)
*B62D 15/02* (2006.01)
(Continued)

(52) U.S. Cl.
CPC .......... *G06K 9/00812* (2013.01); *B60R 1/00* (2013.01); *B60R 11/04* (2013.01); *B60W 30/06* (2013.01);
(Continued)

(58) Field of Classification Search
CPC .............. B62D 15/0285; B62D 15/027; B62D 15/028; B62D 15/0275; B60R 2300/806; B60T 2201/10; G06K 9/00812
See application file for complete search history.

(56) References Cited

U.S. PATENT DOCUMENTS

2009/0243888 A1* 10/2009 Kawabata .............. G08G 1/166
340/932.2
2009/0278709 A1* 11/2009 Endo .................... B62D 15/027
340/932.2
(Continued)

FOREIGN PATENT DOCUMENTS

JP H10-244890 A 9/1998
JP 4320873 B2 8/2009
(Continued)

*Primary Examiner* — Utpal D Shah
(74) *Attorney, Agent, or Firm* — Mintz Levin Cohn Ferris Glovsky and Popeo, P.C.; Peter F. Corless (57) ABSTRACT A smart parking assist apparatus and method are provided. The smart parking assist apparatus operates a smart parking assist function after a vehicle stops and searches a parking slot using a plurality of imaging devices. In addition, the searched parking slot is set to a target parking slot and parking slot information regarding the target parking slot is output. The apparatus recognizes a parking line of the target parking slot and an object adjacent to the target parking slot and sets a parking reference line based on the recognized information, after the parking slot information is output. The vehicle is then operated to be parked in the target parking slot based on the parking reference line.

20 Claims, 11 Drawing Sheets (51) Int. Cl.
  *B60R 11/04*     (2006.01)
  *B60W 30/06*    (2006.01)
  *B60R 1/00*      (2006.01)
  *G05D 1/02*      (2006.01)
  *G08G 1/14*      (2006.01)
  *B60R 11/00*     (2006.01)

(52) U.S. Cl.
  CPC ....... *B62D 15/027* (2013.01); *B62D 15/0285* (2013.01); *G05D 1/0246* (2013.01); *G05D 1/0255* (2013.01); *G06K 9/00798* (2013.01); *G08G 1/143* (2013.01); *B60R 2011/004* (2013.01); *B60R 2300/105* (2013.01); *B60R 2300/303* (2013.01); *B60R 2300/806* (2013.01); *B60T 2201/10* (2013.01)

(56) References Cited

U.S. PATENT DOCUMENTS

2010/0238051 A1*  9/2010  Suzuki ..................... B60R 1/00
                                                    340/932.2
2015/0032319 A1*  1/2015  Kim ..................... B62D 15/027
                                                    701/23

FOREIGN PATENT DOCUMENTS

| JP | 4449701 B2       | 4/2010 |
| JP | 2010-195266 A    | 9/2010 |
| JP | 2014-069721 A    | 4/2014 |
| JP | 5511431 B2       | 6/2014 |
| KR | 10-2012-0086576 A | 8/2012 |
| KR | 10-2013-0013983 A | 2/2013 |
| KR | 10-2013-0072709 A | 7/2013 |
| KR | 10-2014-0087921 A | 7/2014 |

* cited by examiner

SMART PARKING ASSIST APPARATUS AND METHOD

CROSS-REFERENCE TO RELATED APPLICATIONS

This application is a continuation of U.S. patent application Ser. No. 14/809,223, filed Jul. 26, 2015, which is based on and claims the benefit of priority to Korean Patent Application No. 10-2014-0140723, filed on Oct. 17, 2014 in the Korean Intellectual Property Office, the disclosure of which are incorporated herein in its entirety by reference.

TECHNICAL FIELD

The present disclosure relates to a smart parking assist apparatus and method capable of assisting a driver in parking a vehicle by searching a parking slot using an imaging device and an ultrasonic sensor and recognizing a parking line of the searched parking slot.

BACKGROUND

A smart parking assist system (SPAS) is a system that searches a parking slot using an ultrasonic sensor and assists a driver in parking using trajectory creation and automatic steering control to park a vehicle in the searched slot. In this smart parking assist technology, a study regarding a method of utilizing a parking line to determine an environment has been actively conducted.

However, in the smart parking assist system (SPAS) according to the related all, the search starts after a type and a direction of parking slot are selected, and a target parking slot is selected after the vehicle passes through the target parking slot, creating a more complex system and decreasing driver convenience. In other words, according to the related all, multiple switch manipulations are required by the driver to select parking modes (e.g., reverse parking, parallel parking, and forward parking) and parking directions (e.g., left and right).

In addition, according to the related art, a process of scanning using the ultrasonic sensor while moving the vehicle forward to obtain parking slot information is required. Further, in the related art, a parking control starts after the vehicle passes from the parking slot by a predetermined distance after a parking search starts in front of the parking slot by a predetermined distance, which is inconvenient to a user. Additionally, in the related art, the parking control starts by backward movement after the vehicle passes from the parking slot by a predetermined distance, such that a movement distance, a required time, the number of forward movements, and the number of backward movements, and the number of turns are increased until the parking of the vehicle is completed.

SUMMARY

The present disclosure provides a smart parking assist apparatus and method capable of assisting a driver in parking by searching a parking slot using an imaging device and an ultrasonic sensor and recognizing a parking line of the searched parking slot.

According to an exemplary embodiment of the present disclosure, a smart parking assist method may include: operating a smart parking assist function after a vehicle stops; searching a parking slot using imaging devices (e.g., camera, video cameras, and the like) when the smart parking assist function is operated; setting the searched parking slot to a target parking slot and outputting parking slot information regarding the target parking slot; recognizing a parking line of the target parking slot and an object adjacent to the target parking slot and setting a parking reference line based on the recognized information, after the parking slot information is output; and operating parking of the vehicle based on the parking reference line.

In the searching of the parking slot, parking slot information based on a position, a type, and a direction of the searched parking slot may be generated. The parking slot information may include a parking slot position, a parking mode, and a parking direction. The setting of the parking reference line may include: detecting parking line recognition points and object recognition points by detecting a parking line of the target parking slot and an object adjacent to the target parking slot using the imaging devices and ultrasonic sensors when a parking start command is received; detecting parking reference points among the parking line recognition points and the object recognition points; and calculating the parking reference line using the parking reference points.

In the detecting of the parking line recognition points and the object recognition points, the parking line of the target parking slot may be extracted from image information obtained using the imaging devices, and both end points of a width of an entrance of the target parking slot may be selected as the parking line recognition points using the extracted parking line.

In the detecting of the parking line recognition points and the object recognition points, the object positioned in a parking slot adjacent to the target parking slot may be detected using the ultrasonic sensors, and both end points of a width of the detected object may be selected as the object recognition points. In addition, in the detecting of the parking reference points, a driver may be notified that parking is impossible when the parking line recognition points and the object recognition points are not detected or one parking line recognition point is detected.

Further, in the detecting of the parking reference points, the driver may be notified of the possibility that the target parking slot is not a parking slot, and recognition points in an opposite direction that are not recognized may be estimated, when one object recognition point is detected or one parking line recognition point and one object recognition point in the same direction are detected.

Additionally, two object recognition points may be detected as the parking reference points when the two object recognition points are detected. Two parking line recognition points may be detected as the parking reference points when the two parking line recognition points are detected. In particular, X coordinates of recognition points that are positioned within the target parking slot among the parking line recognition points and the object recognition points may be determined to be X coordinates of the parking reference points, and Y coordinates of recognition points that are positioned closest to the vehicle (e.g., at a shortest distance from the vehicle) may be determined to be Y coordinates of the parking reference points. In the calculation of the parking reference line, a substantially straight line perpendicular to a substantially straight line passing through a middle point of fast and second parking reference points, which are the parking reference points, and connecting the fast and second parking reference points to each other may be calculated.

According to another exemplary embodiment of the present disclosure, a smart parking assist apparatus may include: a user input configured to receive an input for a start and a release of a smart parking assist; a plurality of imaging devices configured to obtain image information around a vehicle; ultrasonic sensors configured to obtain position information regarding an object within a parking slot; and a controller configured to operate a smart parking assist function, recognize a parking line and an object using the imaging devices and the ultrasonic sensors to set a parking reference line, and execute parking based on the parking reference line, when a manipulation of the user input is sensed after the vehicle stops.

The imaging devices may be four-channel cameras installed at a front, a rear, a left side, and a right side, respectively, and may be configured to synthesize images photographed by the four-channel cameras to output one top view image. The ultrasonic sensors may be twelve-channel ultrasonic sensors configured of twelve ultrasonic sensors. The smart parking assist apparatus may further include a display configured to display a result based on an operation of the smart parking assist apparatus. The controller may further be configured to detect parking reference points based on the number and positions of parking line recognition points and object recognition points each recognized from the parking line and the object and calculate the parking reference line using the detected parking reference points.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present disclosure will be described in detail with reference to the accompanying drawings.

Figure 1:
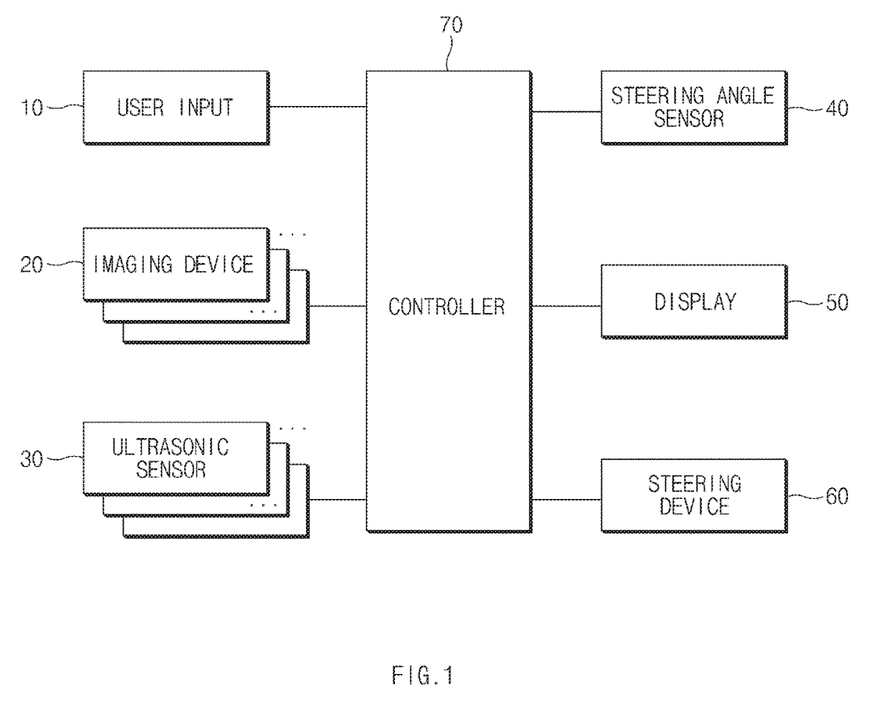
FIG. 1 is an exemplary block diagram showing a configuration of a smart parking assist apparatus according to an exemplary embodiment of the present disclosure.
Figure 2:
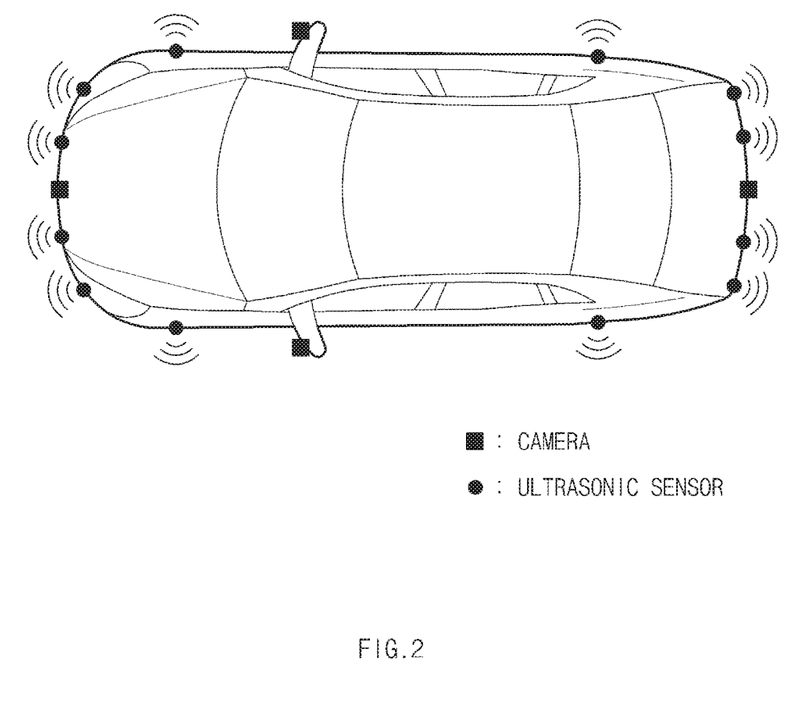
FIG. 2 is an exemplary view showing disposition of a imaging device and an ultrasonic sensor shown in FIG. 1 according to an exemplary embodiment of the present disclosure.

FIG. 1 is an exemplary block diagram showing a configuration of a smart parking assist apparatus according to an exemplary embodiment of the present disclosure; and FIG. 2 is an exemplary view showing disposition of an imaging device and an ultrasonic sensor shown in FIG. 1. As shown in FIG. 1, the smart parking assist apparatus may include a user input 10, a plurality of imaging devices 20, ultrasonic sensors 30, a steering angle sensor 40, a display 50, a steering device 60, and a controller 70. The controller 70 may be configured to operate the user input 10, the imaging devices 20, the ultrasonic sensors 30, the steering angle sensor 40, the display 50, and the steering device 60.

The user input 10, which may be used to receive and input of a control command such as a start (e.g., a smart parking assist function operation), a release, and the like, of a smart parking assist, may be implemented in a form of a switch, a button, a touch button, or the like. The user input 10 may be installed at a position adjacent to a driver's seat to be manipulated by a driver. For example, the user input 10 may be installed in a handle, a driver's seat door armrest, a gear, or the like. The imaging devices 20 (e.g., cameras, video cameras, etc.) may be configured to obtain image information around a vehicle and may be installed at a front surface, a rear surface, a left side, and a right side of the vehicle, respectively, as shown in FIG. 2, to obtain a front image, a rear image, a left side image, and a right side image, and synthesize these images to output one top view image. For example, the imaging devices 20 may be implemented as an around view monitoring (AVM) system. Although four-channel cameras configured of four cameras have been described by way of example in the present exemplary embodiment, the present disclosure is not limited thereto. In other words, the imaging device may be implemented as three-channel cameras or five-channel cameras.

The ultrasonic sensors 30 may be configured to measure distance information between a traveling vehicle (e.g., a subject vehicle) and an object (e.g., another vehicle, a second vehicle, etc.) to obtain information regarding whether the object is within a parking slot and position information of the object. The ultrasonic sensors 30 may be installed at the front, the rear, the front side, and the rear side of the vehicle, respectively, as shown in FIG. 2. Although twelve-channel ultrasonic sensors configured of twelve ultrasonic sensors 30 have been disclosed in the present exemplary embodiment, the present disclosure is not limited thereto. In other words, the number of ultrasonic sensors installed in the vehicle may be adjusted.

The steering angle sensor (SAS) 40 may be configured to measure a steering angle of the vehicle. Therefore, the smart parking assist apparatus may be configured to monitor the steering angle of the vehicle using the steering angle sensor 40. The display 50 may be configured to display or output a result based on an operation of the smart parking assist apparatus to be visually recognized by the driver (e.g., may be configured to display the surrounding environment of the parking space). For example, the display 50 may be configured to display the image information output from the imaging devices 20. In addition, the display 50 may be configured to display a user interface (UI) and a graphic user interface (GUI) associated with the operation of the smart parking assist apparatus.

The display 50 may be implemented by any one of a liquid crystal display, a thin film transistor-liquid crystal display, an organic light-emitting diode, a flexible display, a three-dimensional (3D) display, and a head-up display. The display 50 may be used as an input device and an output device when implemented in a form in which it is combined with a sensor (e.g., touch sensor) sensing a touch operation. In other words, the display 50 may also substitute for the user input 10. The steering device 60 configured to adjust the steering angle of the vehicle, may be implemented by a motor driven power steering (MDPS). The steering device 60 may be configured to automatically adjust the steering of the vehicle based on a control of the controller 70.

The controller 70 may be configured to operate the above-mentioned respective components to perform a smart parking assist. In particular, the controller 70 may be configured to sense a speed of the vehicle using a speed sensor (not shown) mounted within the vehicle to sense whether the vehicle stops. In addition, the controller 70 may be configured to detect a gear input to sense whether the vehicle moves forward or backward. The controller 70 may be configured to search a parking slot using the imaging devices 20 in response to receiving a smart parking assist function operation command (e.g., a smart parking assist start command) after the vehicle stops. For example, when the driver stops the vehicle at the side of the parking slot and then manipulates the user input 10, the controller 70 may be configured to sense the manipulation of the user input to search the parking slot using the imaging devices 20. In addition, the controller 70 may be configured to set the searched parking slot to a target parking slot.

The controller 70 may then be configured to output information regarding the searched parking slot (hereinafter, referred to as "parking slot information") in a form that may be recognized by the driver. The parking slot information may include a parking slot position, a parking mode (type), a parking direction, and the like. Particularly, the controller 70 may be configured to display the parking slot information on a screen of the display 50 or convert the parking slot information into an audio signal and then output the audio signal through a speaker (not shown).

The controller 70 may further be configured to recognize a parking line of the target parking slot and an object positioned adjacently to the target parking slot using the imaging devices 20 and the ultrasonic sensors 30 and set a parking reference line using the recognized information, in response to receiving a parking start command. Particularly, the parking start command may be an input of the user input 10 or a forward movement attempt of the vehicle.

In other words, the controller 70 may be configured to set a coordinate system using the center of axes of rear wheels of the vehicle as an original point and set the parking reference line of the target parking slot. In addition, the controller 70 may be configured to operate the steering device 60 so that the parking reference line coincides with a direction and a position of the vehicle, thereby parking the vehicle in the searched parking slot (e.g., the target parking slot).

Figure 3:
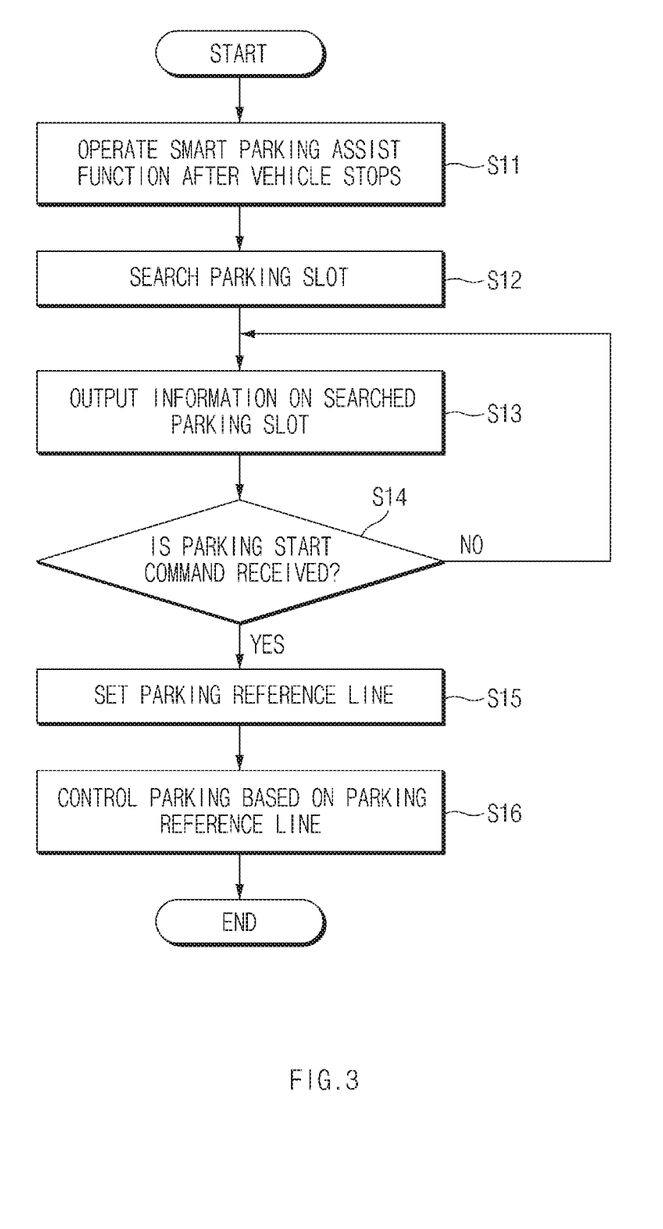
FIG. 3 is an exemplary flow chart showing a smart parking assist method according to an exemplary embodiment of the present disclosure.
Figure 4:
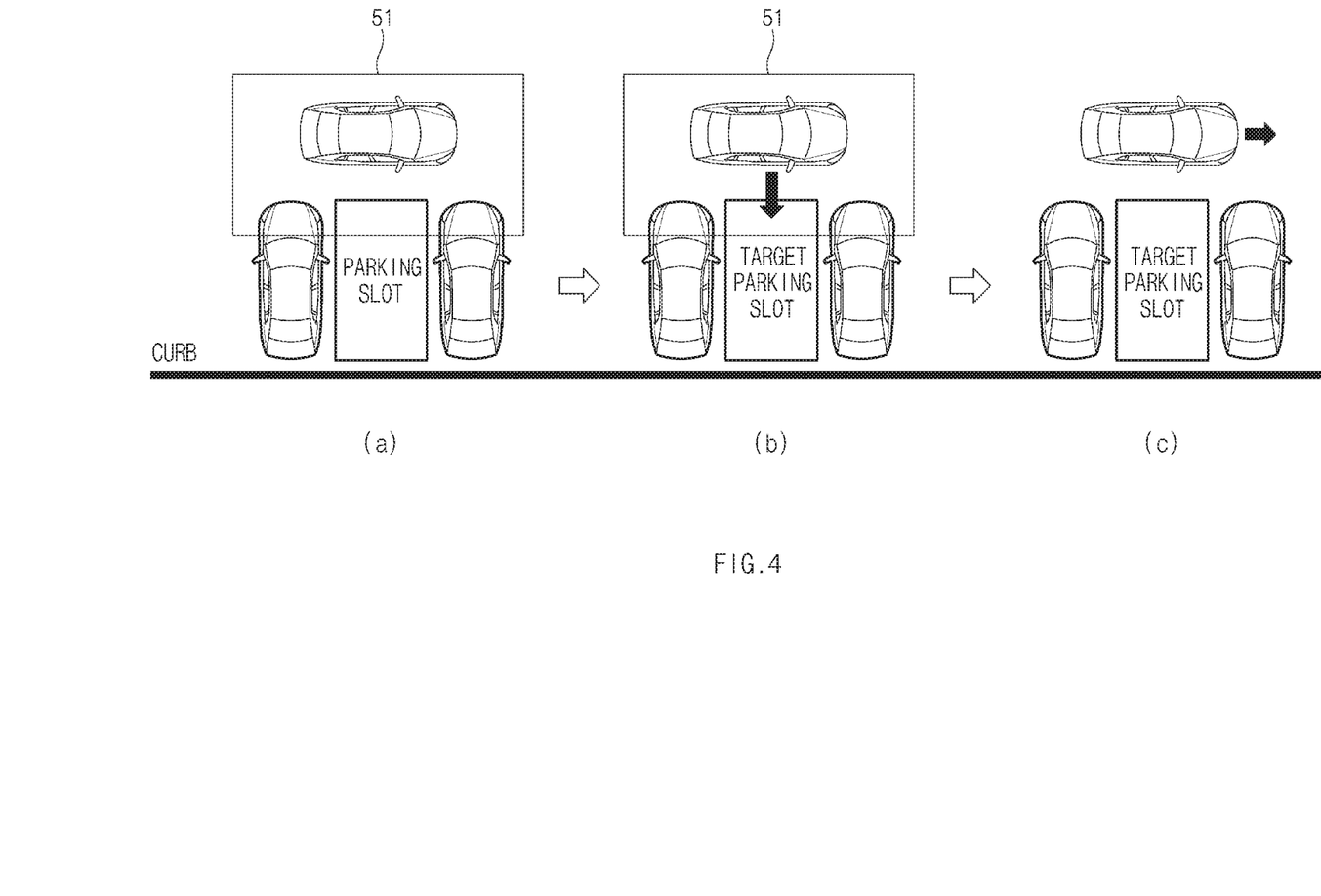
FIG. 4 is an exemplary view showing a parking slot searching process according to an exemplary embodiment of the present disclosure.

FIG. 3 is an exemplary flow chart showing a smart parking assist method according to an exemplary embodiment of the present disclosure; and FIG. 4 shows exemplary views of a parking slot searching process according to an exemplary embodiment of the present disclosure. Referring to FIG. 3, the controller 70 may be configured to execute a smart parking assist function after the vehicle stops (S11). As shown in (a) of FIG. 4, when the driver stops the vehicle at the side of the parking slot and inputs the smart parking assist start command and via the user input part 10, the controller 70 may be configured to execute the smart parking assist function based on the smart parking assist start command. In particular, the controller 70 may be configured to operate the imaging devices 20 to display the obtained image information on a display screen 51. The imaging devices 20 may be configured to obtain the front image, the rear image, the left side image, and the right side image and synthesize the obtained image information, to create and output a top view image.

When the smart parking assist function is operated, the controller 70 may be configured to search the parking slot using the image information obtained using the imaging devices 20 (S12). When the parking slot is searched, the controller 70 may be configured to determine that the corresponding parking slot is the target parking slot. The controller 70 may then be configured to output information regarding the searched parking slot (S13). As shown in (b) FIG. 4, the controller 70 may be configured to display the parking slot information (e.g., an arrow indicating a position of the target parking slot) to be overlapped with the top view image displayed on the display screen 51.

Then, the controller 70 may be configured to confirm whether the parking start command has been input from the user input 10 (S14). For example, the controller 70 may be configured to confirm whether a re-input of a parking switch is present or a forward movement attempt of the vehicle is present. When the parking start command is received, the controller 70 may be configured to set the parking reference line for the parking slot (e.g., the target parking slot) (S15). Then, the controller 70 may be configured to operate the steering device 60 to execute the parking so that the center of the axes of the rear wheels of the vehicle coincides with the set parking reference line (S16).

In an exemplary embodiment of the present disclosure, the parking reference line may be calculated and updated at a predetermined period until the parking of the vehicle is completed (e.g., parking reference line is repeatedly updated until parking is complete). Therefore, although a parking accuracy may be decreased due to a position estimation error of the vehicle during an operation based on an initially set parking reference line, the parking reference line may be reset after a point in time (e.g., after a predetermined amount of time) in which the parking reference point appears on the display screen, to thus decrease an error.

Figure 5:
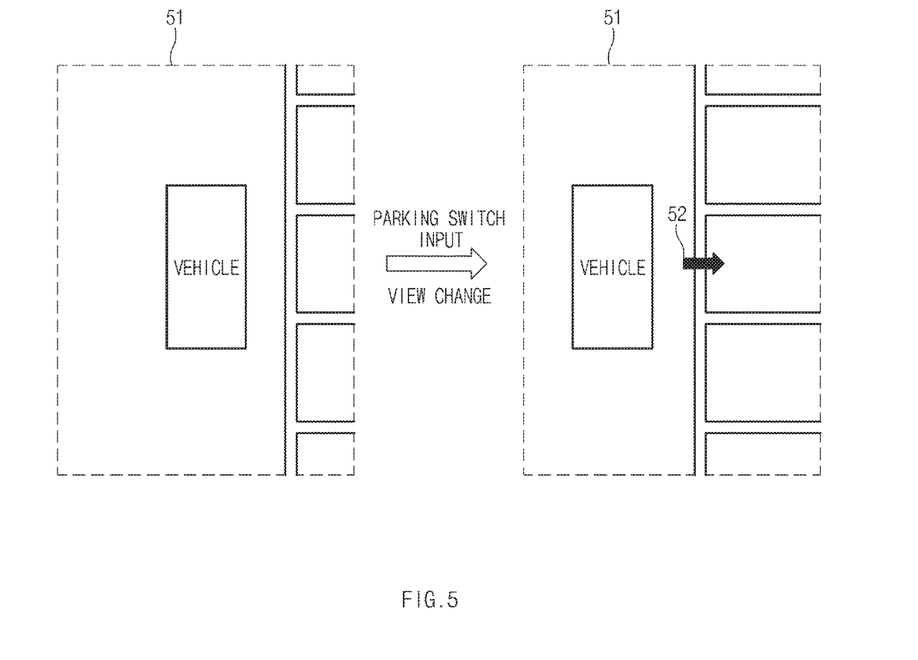
FIG. 5 is an exemplary view showing a display screen during searching a parking slot according to an exemplary embodiment of the present disclosure.

FIG. 5 is an exemplary view showing a display screen during a search of a parking slot according to an exemplary embodiment of the present disclosure. As shown in FIG. 5, the controller 70 may be configured to display the images obtained using the imaging devices 20 as the top view image on the display screen 51 when the vehicle stops. In particular, when the controller 70 senses an input of the parking switch, the controller 70 may be configured to search the parking slot, enlarge the searched parking slot in a predetermined ratio (e.g., zoom in), and display the enlarged parking slot. In addition, the controller 70 may be configured to display an indicator 52 that indicates a position of the parking slot.

As described above, in an exemplary embodiment of the present disclosure, a view may be adjusted to enlarge and display a position and a slot form of the target parking slot in which the vehicle is to be parked based on the target parking slot for the driver to visually confirm the position and the slot form of the target parking slot.

Figure 6:
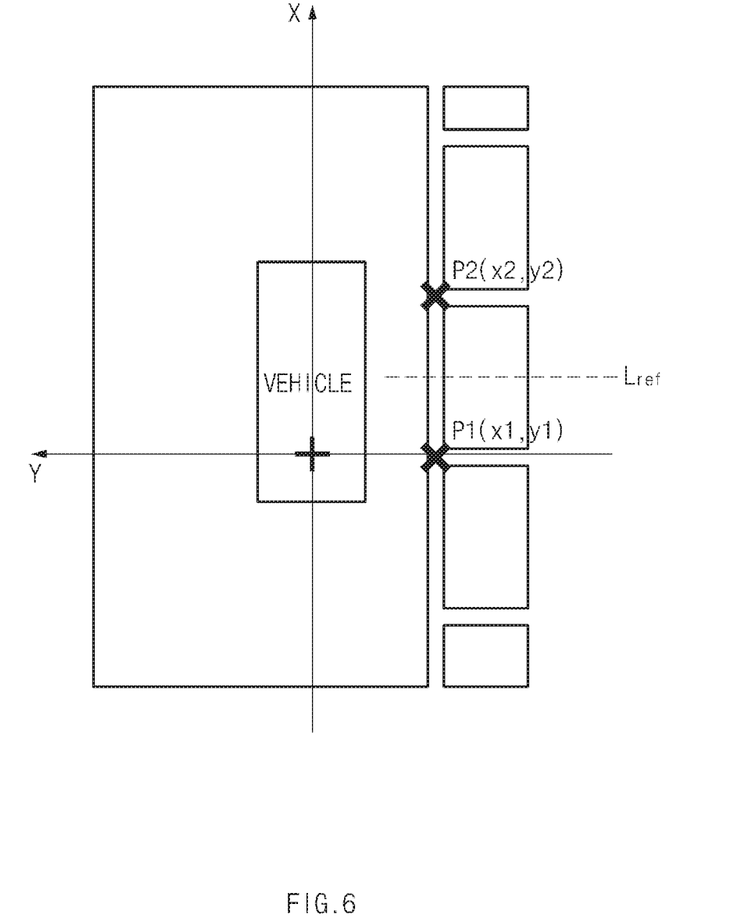
FIG. 6 is an exemplary diagram describing a parking reference line setting method according to an exemplary embodiment of the present disclosure.

FIG. 6 is an exemplary diagram describing a parking reference line setting method according to an exemplary embodiment of the present disclosure. First, the controller 70 may be configured to set the parking reference line of the target parking slot using the image information obtained using the imaging devices 20 during the start of parking the vehicle. In particular, the controller 70 may be configured to calculate coordinates P1 (fast parking reference point) and P2 (second parking reference point) of both end points (parking reference points) of an entrance of the target parking slot using the center of axes of rear wheels of the vehicle as an original point of a coordinate system, using a vehicle progress direction as an X axis, and using a direction rotating from the X axis by 90 degrees in a counterclockwise direction as a Y axis.

In addition, the controller 70 may be configured to set a substantially straight line perpendicular to a substantially straight line passing through the middle point of the calculated two coordinates P1 and P2 and connecting the two coordinates to each other to the parking reference line $L_{ref}$. Then, the controller 70 may be configured to operate the steering device 60 so that a direction and a position of the vehicle coincide with the parking reference line. For example, the controller 70 may be configured to operate the steering device 60 to perform a forward movement operation on the vehicle (e.g., operate the steering device 60 to cause the vehicle to travel forward) so that a central line of the vehicle in a length direction coincides the parking reference line and then park the vehicle in the target parking slot using a backward movement operation.

The smart parking assist apparatus according to an exemplary embodiment of the present disclosure may be configured to repeatedly perform the above-mentioned parking reference line setting process per a predetermined period until the parking is completed. Therefore, in an exemplary embodiment of the present disclosure, a parking accuracy may be improved.

Figure 7:
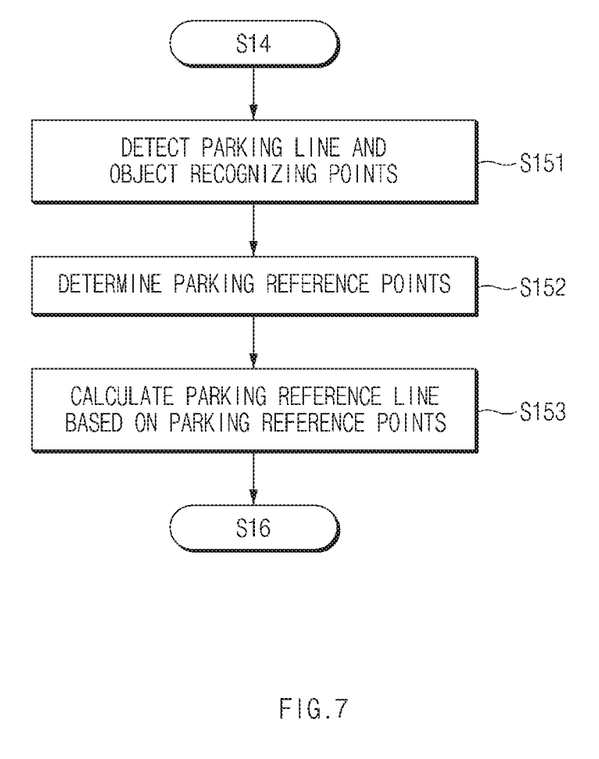
FIG. 7 is an exemplary flow chart showing the parking reference line setting method according to an exemplary embodiment of the present disclosure.

FIG. 7 is an exemplary flow chart showing the parking reference line setting method according to an exemplary embodiment of the present disclosure. The present exemplary embodiment may be applied even when the parking line is covered with the object (e.g., another vehicle), causing the parking line of the target parking slot to not be recognized.

The controller 70 may be configured to detect parking line recognition points and object recognition points using the imaging devices 20 and the ultrasonic sensors 30 (S151). In other words, the controller 70 may be configured to extract the parking line of the target parking slot from the image information obtained using the imaging devices 20 and detect both end points of an entry zone parking line of the target parking slot in the extracted parking line as the parking line recognition points. The controller 70 may then be configured to calculate coordinates of the detected parking line recognition points and store the calculated coordinates in a memory (not shown). In addition, the controller 70 may be configured to measure a distance between the vehicle and the object (e.g., another vehicle) using the ultrasonic sensors 30 and detect the object recognition points based on information regarding the measured distance. For example, the controller 70 may be configured to detect points at which data measured using the ultrasonic sensors 30 are rapidly changed as the object recognition points.

Further, the controller 70 may be configured to determine a first parking reference point and a second parking reference point among the detected recognition points (S152). Particularly, the controller 70 may be configured to determine the parking reference points based on the number of detected parking line recognition points and the number of detected object recognition points. A detailed description for a method of determining the parking reference points will be provided below. When the parking reference points are determined, the controller 70 may be configured to calculate the parking reference line based on the parking reference points (S153). In other words, a straight line perpendicular to a straight line passing through the middle of the first and second parking reference points and connecting the first and second parking reference points to each other may be set to the parking reference line.

Figure 8:
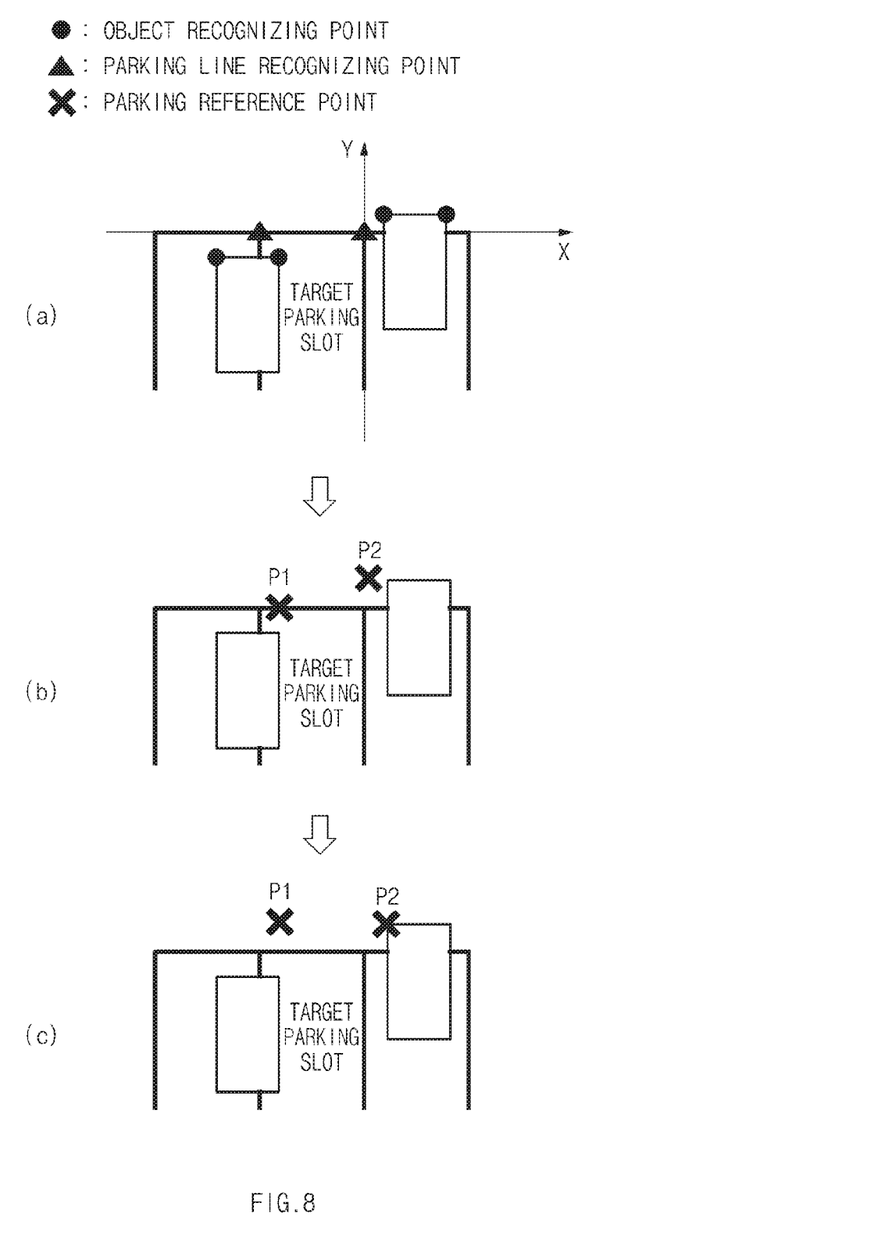
FIG. 8 is an exemplary view showing a parking reference point determining process according to an exemplary embodiment of the present disclosure.
Figure 9:
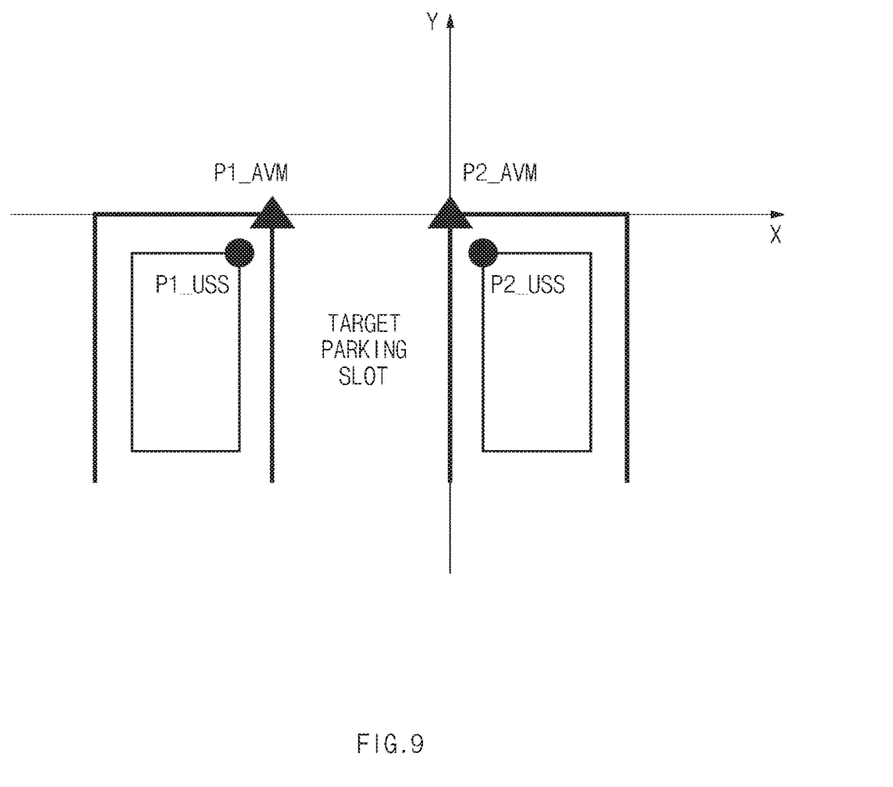
FIG. 9 is an exemplary view showing parking line recognition points and object recognition points.

FIG. 8 shows exemplary views of a parking reference point determining process according to an exemplary embodiment of the present disclosure; and FIG. 9 is an exemplary view showing parking line recognition points and object recognition points.

As shown in (a) of FIG. 8, the controller 70 may be configured to detect recognition points for the target parking slot. In other words, the controller 70 may be configured to detect the parking line of the target parking slot within the image information to detect the parking line recognition points. In addition, the controller 70 may be configured to detect object recognition points for the target parking slot and an object (e.g., another vehicle) that is within a parking slot neighboring to the target parking slot using the ultrasonic sensors 30. Referring to FIG. 9, the controller 70 may be configured to detect both end points of a width of an entrance of the target parking slot into which the vehicle enters when being parked as parking line recognition points P1_AVM and P2_AVM using the imaging devices 20, and detect points near to the parking line of the target parking slot among both end points of a width of an object as object recognition points P1_USS and P2_USS using the ultrasonic sensors 30.

Additionally, controller 70 may be configured to determine that two of the recognition points are the parking reference points. In particular, methods in which the controller 70 determines the parking reference points based on the number of parking line recognition points and the number of object recognition points may be different from each other as shown in Table 1 below.

point the closest to the vehicle (e.g., at a least distance from the vehicle) among the recognition points may be selected as the Y coordinate of the parking reference point.

FIGS. 10A to 10D show examples of determining the parking reference points according to an exemplary embodiment of the present disclosure. When the parking reference points are determined by a combination of parking line and object recognition results will be described by way of example in the present exemplary embodiment.

Figure 10A:
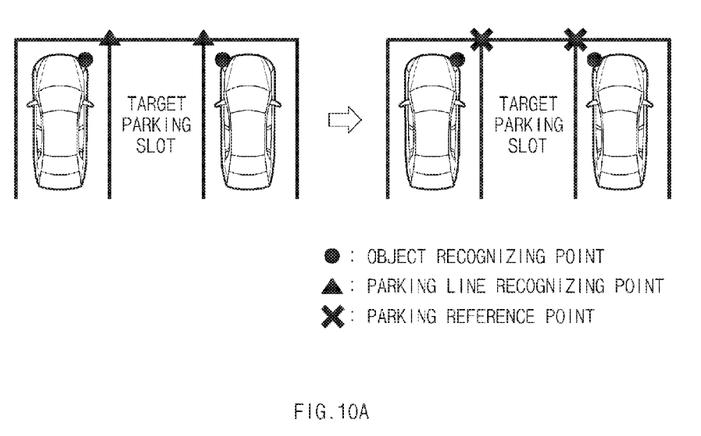
FIGS. 10A to 10D show exemplary methods of determining the parking reference points according to an exemplary embodiment of the present disclosure.

First, as shown in FIG. 10A, when vehicles are parked in parking slots adjacent to the target parking slot, the parking line recognition points within the target parking slot may be determined to be the parking reference points. In particular, X coordinates of the parking reference points may be

TABLE 1

| The Number of Parking line Recognizing Points | The Number of Object Recognizing Points | Decision of Compensation Control |
| --- | --- | --- |
| 0 | 0 | Notify driver that parking is impossible |
| 0 | 1 | Inform driver possibility that target parking region will not be parking region<br>Estimate recognizing points in opposite direction that are not recognized |
| 0 | 2 | Set parking reference points only by object recognizing points |
| 1 | 0 | Notify driver that parking is impossible (gradient of parking slot may not be recognized) |
| 1 | 1 (Same direction) | Inform driver possibility that target parking region will not be parking region<br>Estimate recognizing points in opposite direction that are not recognized |
| 1 | 1 Different directions | Apply fusion logic between recognized recognizing points |
| 1 | 2 | Apply fusion logic between recognized recognizing points |
| 2 | 0 | Set reference points only by parking line recognizing points |
| 2 | 1 | Apply fusion logic between recognized recognizing points |
| 2 | 2 | Apply fusion logic between recognized recognizing points |

As shown in (b) of FIG. 8, a greater value of X coordinates of the parking line recognition point and the object recognition point may be selected as an X coordinate of the first parking reference point P1, and a greater value of Y coordinates of the parking line recognition point and the object recognition point may be selected as a Y coordinate of the first parking reference point P1.

In addition, a smaller value of the X coordinates of the parking line recognition point and the object recognition point may be selected as an X coordinate of the second parking reference point P2, and the greater value of the Y coordinates of the parking line recognition point and the object recognition point may be selected as a Y coordinate of the second parking reference point P2.

Then, the controller 70 may be configured to unite (e.g., correlate) the Y coordinates of the first and second parking reference points P1 and P2 to the greater value of the Y coordinates, as shown in (c) of FIG. 8. The controller 70 may then be configured to set the object recognition points to the parking reference points when a size of the target parking slot set by the parking reference points is a reference or less. In other words, an X coordinate of a recognition point positioned within the target parking slot among the recognition points may be selected as the X coordinate of the parking reference point, and a Y coordinate of a recognition selected to set a width of the target parking slot to be substantially narrow. In other words, the smart parking assist apparatus may be configured to determine the parking reference points using parking line recognizing information of the target parking slot.

Figure 10B:
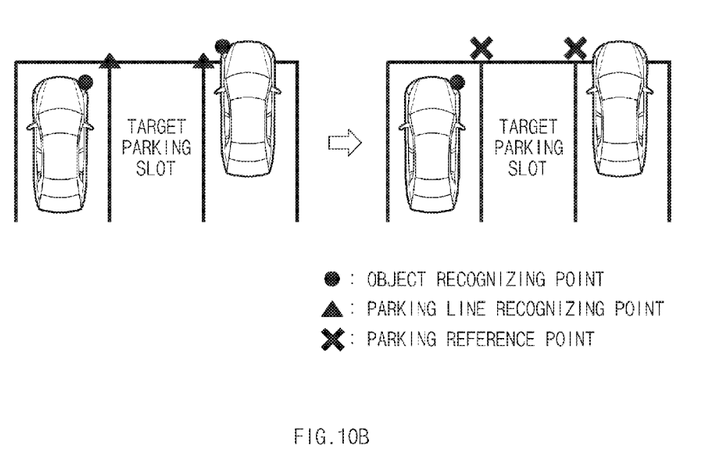

Further, as shown in FIG. 10B, when a vehicle is parked in one of the parking slots (e.g., a fast adjacent parking slot) adjacent to the target parking slot and another vehicle is parked in the other of the parking slots (e.g., a second adjacent parking slot) adjacent to the target parking slot when it is partially out of an entry zone of the other parking slot, the parking reference points may be determined based on parking line recognition information regarding the target parking slot and recognition information regarding the vehicles parked in the parking slots adjacent to the target parking slot. Additionally, X coordinates of the parking reference points may be determined to be X coordinates of the parking line recognition points of the target parking slot, and Y coordinates of the parking reference points may be determined to be Y coordinates of the object recognition points.

Figure 10C:
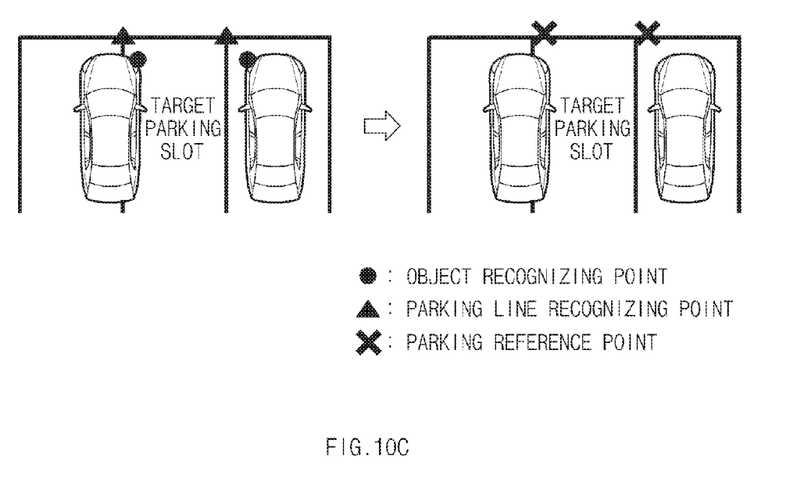

Referring to FIG. 10C, when a vehicle parked in one of the parking slots adjacent to the target parking slot occupies a portion of the target parking slot, the parking reference points may be determined based on parking line and object recognition information as in FIG. 10B. In particular, the smart parking assist apparatus may be configured to determine the parking reference points based on a recognized width of the target parking slot.

For example, the controller 70 of the smart parking assist apparatus may be configured to correct the parking reference points using the object recognition points when a width of the parking slot recognized using the imaging devices 20 and the ultrasonic sensors 30 is a reference width or greater or a determined distance between the parking reference points is a reference distance or less.

Figure 10D:
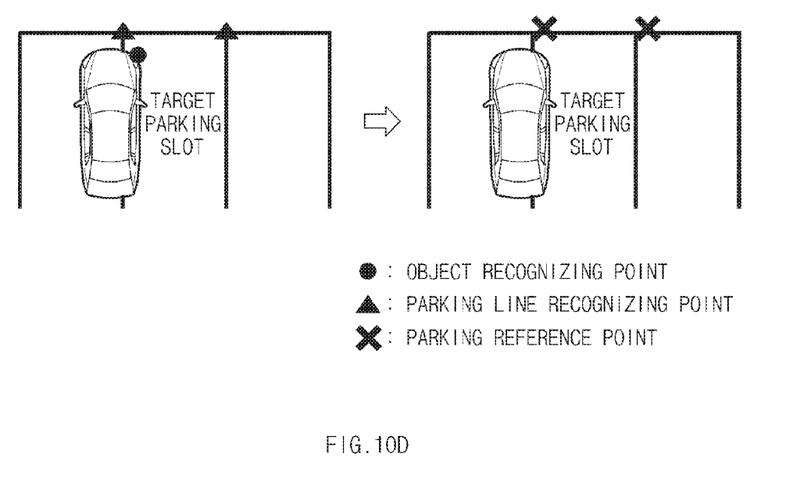

Referring to FIG. 10D, when any one of the parking slots adjacent to the target parking slot is empty and a vehicle parked in the other of the parking slots adjacent to the target parking slot occupies a portion of the target parking slot, since a width of the target parking slot increases, a slot that corresponds to a general size (e.g., a typical or standard size) of the parking slot may be set to the target parking slot.

As set forth above, the smart parking assist apparatus according to an exemplary embodiment of the present disclosure may be configured to search a parking slot using a plurality of imaging devices and ultrasonic sensors and recognize the parking line of the searched parking slot to assist a driver in parking of the vehicle. The smart parking assist apparatus may be configured to execute the smart parking assist by manipulating a parking switch once and determine an appropriate parking mode and parking direction using the image recognizing result obtained using the imaging devices.

In addition, the smart parking assist apparatus according to an exemplary embodiment of the present disclosure may be configured to obtain the parking slot information using the image information obtained from the imaging devices when the vehicle stops, such that it is not required to move the vehicle forward to search the parking slot, as was required in the related art. Further, the smart parking assist apparatus according to an exemplary embodiment of the present disclosure may be configured to search the parking slot and start to perform a parking control after the vehicle stops at the side of the parking slot, thereby making it possible to improve convenience of the use of the driver.

The smart parking assist apparatus according to an exemplary embodiment of the present disclosure may further be configured to start executing the parking control (parking) by forward movement at a place near to the parking slot, such that a movement distance, a required time, the number of forward movements, and the number of backward movements, and the number of turns until the parking of the vehicle is completed may be decreased as compared with the related art.

What is claimed is:

1. A smart parking assist method, performed by a parking assist apparatus of a vehicle, the method comprising:
upon receiving a smart parking assist start command from a user, operating a smart parking assist function;
searching a parking slot using imaging devices when the smart parking assist function is operated;
presenting searched parking slot information to the user;
upon receiving a parking start command from the user, detecting a parking line of a target parking slot and at least one object adjacent to the target parking slot; and
operating a steering device to execute parking of the vehicle according to a parking reference line, wherein the parking reference line is set as a straight line perpendicular to a straight line connecting two coordinates of both end points of an entrance of the target parking slot and passing through a middle point of the two coordinates,
wherein the presenting searched park slot information to the user includes displaying the searched parking slot information to be overlapped with a view image displayed on a display screen,
wherein the view image is created and output using a front image, a rear image, a left side image, and a right side image of the vehicle that are obtained by the imaging devices, and
wherein the operating of the steering device to execute parking of the vehicle according to the parking reference line includes controlling a center of axes of rear wheels of the vehicle to coincide with the parking reference line.

2. The smart parking assist method according to claim 1, wherein in the searching of the parking slot, parking slot information based on a position, a type, and a direction of the searched parking slot is generated.

3. The smart parking assist method according to claim 2, wherein the parking slot information includes at least one selected from the group consisting of: a parking slot position, a parking mode, and a parking direction.

4. The smart parking assist method according to claim 1, further comprising setting the parking reference line based on detected information of a parking line of the target parking slot and at least one object adjacent to the target parking slot.

5. The smart parking assist method according to claim 1, wherein the setting of the parking reference line includes:
detecting, by a controller included in the parking assist apparatus, parking line recognition points and object recognition points by detecting a parking line of the target parking slot and an object adjacent to the target parking slot using the imaging devices and ultrasonic sensors when a parking start command is received;
detecting, by the controller, parking reference points among the parking line recognition points and the object recognition points; and
calculating, by the controller, the parking reference line using the parking reference points.

6. The smart parking assist method according to claim 5, wherein in the detecting of the parking line recognition points and the object recognition points, the parking line of the target parking slot is extracted from image information obtained using the imaging devices, and both end points of a width of an entrance of the target parking slot are selected as the parking line recognition points using the extracted parking line.

7. The smart parking assist method according to claim 5, wherein in the detecting of the parking line recognition points and the object recognition points, the object positioned in a parking slot adjacent to the target parking slot is recognized using the ultrasonic sensors, and both end points of a width of the recognized object are selected as the object recognition points.

8. The smart parking assist method according to claim 5, wherein in the detecting of the parking reference points, a notification is output, by the controller, indicating that parking is impossible when the parking line recognition points and the object recognition points are not detected or one parking line recognition point is detected.

9. The smart parking assist method according to claim 5, wherein in the detecting of the parking reference points, the possibility that the target parking slot is not a parking slot is output as a notification, and recognition points in an opposite direction that are not recognized are estimated, when one object recognition point is detected or parking line recognition point and one object recognition point in the same direction are detected.

10. The smart parking assist method according to claim 5, wherein in the detecting of the parking reference points, two object recognition points are detected as the parking reference points when the two object recognition points are detected.

11. The smart parking assist method according to claim 5, wherein in the detecting of the parking reference points, two parking line recognition points are detected as the parking reference points when the two parking line recognition points are detected.

12. The smart parking assist method according to claim 5, wherein in the detecting of the parking reference points, X coordinates of recognition points positioned within the target parking slot among the parking line recognition points and the object recognition points are determined to be X coordinates of the parking reference points, and Y coordinates of recognition points positioned closest to the vehicle are determined to be Y coordinates of the parking reference points.

13. The smart parking assist method according to claim 5, wherein in the calculating of the parking reference line, a straight line perpendicular to a straight line passing through a middle point of first and second parking reference points, which are the parking reference points, and connecting the first and second parking reference points to each other is calculated.

14. A smart parking assist apparatus, comprising:
   a user input that receives an input for a start and a release of a smart parking assist;
   a plurality of imaging devices that obtains image information around a vehicle;
   a plurality of sensors that obtains position information regarding an object within a parking slot; and
   a controller that operates a smart parking assist function when receiving a smart parking assist start command from a user, searches a parking slot using obtained image supplied by the imaging devices when the smart parking assist function is operated, presents searched parking slot information to the user by displaying the searched parking slot information to be overlapped with a view image displayed on a display screen, detects a parking line of a target parking slot and at least one object adjacent to the target parking slot when receiving a parking start command from the user and operates a steering device to execute parking of the vehicle according to a parking reference line, wherein the parking reference line is set as a straight line perpendicular to a straight line connecting two coordinates of both end points of an entrance of the target parking slot and passing through a middle point of the two coordinates,
   wherein the view image is created and output using a front image, a rear image, a left side image, and a right side image of the vehicle that are obtained by the imaging devices, and
   wherein the controller operates the steering device to execute parking of the vehicle by controlling a center of axes of rear wheels of the vehicle to coincide with the parking reference line.

15. The smart parking assist apparatus according to claim 14, wherein the controller recognizes a parking line and an object using the imaging devices and the ultrasonic sensors to set the parking reference line and to execute parking based on the parking reference line, when a manipulation of the user input is sensed after the vehicle stops.

16. The smart parking assist apparatus according to claim 14, wherein the imaging devices are four-channel cameras installed at a front, a rear, a left side, and a right side, respectively, and are configured to synthesize images photographed by the four-channel cameras to output a top view image.

17. The smart parking assist apparatus according to claim 16, wherein the sensors are twelve-channel ultrasonic sensors comprising twelve ultrasonic sensors.

18. The smart parking assist apparatus according to claim 14, further comprising:
   a display configured to display a result based on an operation of the smart parking assist apparatus.

19. The smart parking assist apparatus according to claim 14, wherein the controller detects parking reference points based on the number and positions of parking line recognizing points and object recognition points each recognized from the parking line and the object and calculates the parking reference line using the detected parking reference points.

20. The smart parking assist apparatus according to claim 19, wherein the controller calculates a straight line perpendicular to a straight line passing through a middle point of first and second parking reference points configuring the parking reference points and connects the first and second parking reference points to each other as the parking reference line.

* * * * *